June 22, 1937.  H. J. C. WELLS  2,084,470

STEAM TRAP

Filed Sept. 11, 1934

INVENTOR.
Herbert J. Clement Wells
BY Lawrence K. Sager
his ATTORNEY.

Patented June 22, 1937

2,084,470

UNITED STATES PATENT OFFICE 2,084,470

STEAM TRAP

Herbert James Clement Wells, Jackson Heights, N. Y.

Application September 11, 1934, Serial No. 743,570

8 Claims. (Cl. 236—56)

This invention relates to steam or vapor traps and to valves and is particularly applicable to the usual radiators for heating buildings.

The main object of this invention is to provide an improved form of valve and trap which will be durable and efficient under long continued use with all parts well protected and insure the proper seating and closure of the valve and proper response to temperature changes. Another object is to provide a simple form of construction of comparatively few parts adapted to be conveniently assembled. Another object is to attain convenient and economical manufacture. Other objects and advantages will be understood from the following specification and accompanying drawing showing a preferred embodiment of the invention.

Figure 1:
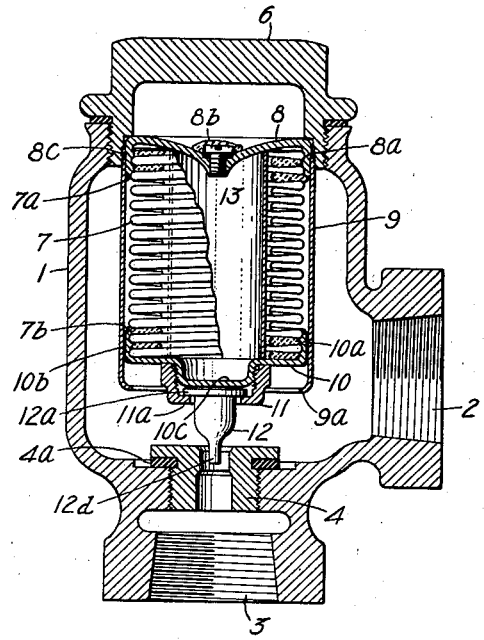
Figure 2:
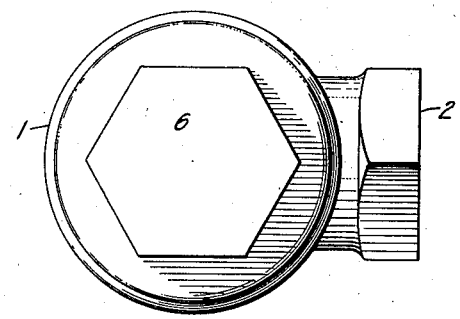

Fig. 1 is a vertical section of the improved trap with the expansible element partly in elevation; and Fig. 2 is a plan view.

The structure comprises a main body enclosing portion 1 having a side inlet opening 2 for connection to a source of steam or vapor, and a downwardly extending outlet 3 adapted to be connected to a return pipe. Above the outlet is a seat 4 having an externally threaded lower portion engaging the body portion of the valve at the outlet opening and forming a tight joint by an intervening gasket 4a. The seat 4 has an opening therethrough for discharge of the condensate.

The top of the body portion is closed by a cap 6 in the form of a nut having its lower portion externally threaded to engage the interior wall of the body portion of the trap. The opening closed by the cap is sufficiently large to permit the removal therewith of the controlling valve. The valve structure comprises an expansible and contractible element 7 of tubular form and of the helical corrugated metal bellows type forming screw thread convolutions as indicated in Fig. 1. The upper end of the bellows is closed by an end piece 8 of sheet metal having a downwardly extending rim 8a threaded on its interior to receive and envelop the external thread convolutions of the bellows at its upper end. Thus a firm mechanical connection and support of the bellows with the end piece 8 is formed by merely screwing the end piece on the end of the bellows. This screw joint is also soldered around the joint 7a to insure that the end piece hermetically seals the upper end of the bellows. The center of the end piece 8 has a small threaded opening closed by a screw 8b for permitting the convenient insertion of the volatile liquid within the bellows, after which a drop of solder may be used to cover the screw for making an air tight joint or a proper gasket under the screw head may be used for that purpose.

The lower inner portion of the cap 6 is machined to form a circular recess for reception of the end piece 8 which fits within it against a shoulder of the recess. This recess is threaded for reception of the threaded end of a metal tube 9 which encloses and shields the corrugated element 7. The end of the tube 9 is nicely fitted over the outside of the rim 8a and impinges against a small shoulder 8c formed on the outside of the rim 8a. Thus when the tube 9 is screwed into the recess of the cap, it holds the end piece 8 firmly in place against its seat in the cap. The tube 9 has an inwardly extending rim 9a at its lower end. The end piece 8 is die pressed to the general form shown including the formation of the threads on the interior of its rim for engagement with the bellows 7. Thus the end piece is simply and economically made.

The lower end of the expansible element 7 is closed by another end piece 10 also formed from sheet metal. It has an upwardly extending rim 10a which is internally threaded to receive and envelop the screw convolutions of the element 7, the screw joint being soldered at 7b to hermetically seal the corrugated tube. The outside of the rim 10a has vertical extending abutments 10b formed thereon at suitably spaced intervals which engage the interior of the tube 9 and serve as guides for the lower end of the tubular element 7. The inwardly extending rim 9a serves as a stop to limit the outer position of the end piece 10 during tests. The tube 9 also serves to further protect and shield the bellows from erosion and from particles of foreign matter which might lodge in the folds of the exterior of the bellows.

The central portion of end piece 10 is depressed to form a protuberance 10c. This is threaded on its exterior tubular portion to receive an internally threaded nut 11. The nut has a downwardly extending portion and an inwardly extending rim 11a and serves to carry the movable head 12 of the valve. This head has an outwardly extending rim 12a at its top for loosely carrying it between the interior of the nut 11 and the part 10c. The body portion of the valve head 12 loosely passes through the opening within the rim 11a and is spherically shaped with a stem projecting end 12d entering the valve seat opening. Within the corrugated element 7 is a metal tube 13 which rests on the interior of the end plate 10 and serves as a guide for the interior of the bellows. It also prevents contraction of the bellows beyond a certain limit by then engaging the interior of the end plate 8. The end piece 10 is die pressed to its general form from sheet metal, including the threads within the rim 10a for reception of the convolutions of the lower end of the bellows. It is thus simply and economically made and serves not only to seal the lower end of the bellows but as a guide within the tube 9 and likewise for carrying the nut which supports the movable valve head. It also serves as a seat against which the head of the valve head 12 impinges when the latter is forced to its closed position.

In operation, the incoming steam from the radiator will heat the controlling parts causing the volatile liquid within the bellows to volatilize and force the valve to its closed position. During the closing action, the valve head 12 is self-adjusting being freely movable in its support to seat itself in proper alignment and thus insure complete closure of the valve. When the condensate has accumulated sufficiently to cause the cooling of the controlling parts, the vapor of the volatile liquid in the bellows will then condense and reduce the internal pressure and allow the bellows to contract and open the valve. After the condensate has passed out to the return of the system, the incoming steam will again cause the closure of the valve as above described.

It is evident that by this invention simplicity and economy in manufacture are obtained and the parts are simply and conveniently assembled. All parts are well protected which together with the rugged construction insures durability and dependability. Likewise the movable valve element is made self-aligning by a simple form of structure.

Although a preferred embodiment of this invention is disclosed, various modifications may be made without departing from the scope thereof; and various applications of the invention may be made to both automatic and manually operated valves.

I claim:—

1. A valve comprising an expansible element of the bellows type with screw thread convolutions, a sheet metal plate having a rim enveloping the outside of one end of said expansible element, said sheet metal plate having a central protruding portion, and an element embracing said protruding portion, the moveable head of the valve being supported between said last named element and said protruding portion.

2. A valve comprising an expansible element of the bellows type with screw thread convolutions, a sheet metal plate having a rim enveloping the outside of one end of said expansible element and having a screw thread engagement therewith and having a central screw thread protruding portion, and an element embracing said protruding portion and having a screw thread engagement therewith, the movable head of the valve being supported between said last named element and said protruding portion.

3. A trap comprising a cap, an expansible element of the bellows type with screw thread convolutions, a sheet metal plate supported by said cap and having a rim enveloping the outside of one end of said expansible element, a second sheet metal plate having a rim enveloping the outside of the other end of said expansible element and having a screw thread engagement therewith, said second plate having a central protruding portion, and an element embracing said protruding portion, the movable head of the valve of the trap being supported between said last named element and said protruding portion.

4. A trap comprising a cap, an expansible element of the bellows type with screw thread convolutions, a sheet metal plate supported by said cap and having a rim enveloping the outside of one end of said expansible element and having a screw thread engagement therewith, a second sheet metal plate having a rim enveloping the outside of the other end of said expansible element and having a screw thread engagement therewith and having a screw thread central protruding portion, and a nut threaded on said protruding portion, the movable head of the valve of the trap being loosely supported between said nut and said protruding portion.

5. A trap comprising a cap having a recess and having a shoulder in said recess, an expansible element of the bellows type, a plate seated against said shoulder within said recess and covering one end of and supporting said expansible element, a tubular shield enclosing said expansible element and secured to said cap and holding said plate in position against said shoulder and guiding said expansible element, and means for supporting the movable head of the valve of the trap from the other end of said expansible element.

6. A trap comprising a cap, an expansible element of the bellows type with screw thread convolutions, a sheet metal plate having an internally threaded rim engaging one end of said expansible element, said plate being seated in a recess in said cap, a tubular shield enclosing said expansible element and having at one end a threaded engagement with said cap and holding said plate in position, and means for supporting the movable head of the valve of the trap from the other end of the said expansible element.

7. A trap comprising a body having a side inlet and a downwardly extending outlet, a cap covering an opening in said body opposite the outlet, an expansible element of the bellows type supported at one end by said cap and subjected to and responsive to change of temperature of the medium received through said inlet, means for supporting the movable head of the valve of the trap from the other end of said expansible element, and a tubular shield enclosing said expansible element and support by said cap at one end and having an inwardly extending portion at the other end for limiting the maximum expansion of the expansible element.

8. A trap comprising a body having a side inlet and a downwardly extending outlet, a cap covering an opening in said body opposite the outlet, an expansible element of the bellows type supported at one end by said cap and subjected to and responsive to change of temperature of the medium received through said inlet, means for supporting the movable head of the valve of the trap from the other end of said expansible element and a tubular shield enclosing said expansible element and supported by said cap at one end and having an inwardly extending portion at the other end for limiting the maximum expansion of the expansible element, said shield having an interior portion engaging said expansible element for guiding its movement.

HERBERT JAMES CLEMENT WELLS.